(12) United States Patent
Legerton et al.

(10) Patent No.: US 8,801,175 B2
(45) Date of Patent: Aug. 12, 2014

(54) SYSTEM AND METHOD FOR COMMUNICATING THE GEOMETRY OF A CONTACT LENS

(75) Inventors: Jerome A. Legerton, San Diego, CA (US); William Meyers, Scottsdale, AZ (US)

(73) Assignee: CRT Technology, Inc., Mesa, AZ (US)

( * ) Notice: Subject to any disclaimer, the term of this patent is extended or adjusted under 35 U.S.C. 154(b) by 215 days.

(21) Appl. No.: 13/401,313

(22) Filed: Feb. 21, 2012

(65) Prior Publication Data

US 2012/0212704 A1   Aug. 23, 2012

Related U.S. Application Data

(60) Provisional application No. 61/445,829, filed on Feb. 23, 2011.

(51) Int. Cl.
*G02C 7/04* (2006.01)

(52) U.S. Cl.
USPC ............. 351/159.12; 351/159.23; 351/159.74

(58) Field of Classification Search
USPC ........................... 351/159.12, 159.23, 159.74
See application file for complete search history.

(56) References Cited

U.S. PATENT DOCUMENTS

| 2006/0126015 A1* | 6/2006 | Legerton et al. .......... 351/160 R |
| 2010/0060849 A1* | 3/2010 | Hibino ..................... 351/160 R |

* cited by examiner

*Primary Examiner* — Jordan Schwartz
(74) *Attorney, Agent, or Firm* — Snell & Wilmer L.L.P.

(57) ABSTRACT

In exemplary embodiments, this invention comprises a method for communicating the geometry of a contact lens to a manufacturer. The method includes describing the shape of a first zone of a contact lens and describing the shape of a second zone of the contact lens by providing an angle of orientation from a reference point located on the first zone. The method may further include describing the shape of one or more additional zones by providing angles of orientation from a reference point on another zone.

15 Claims, 10 Drawing Sheets

SYSTEM AND METHOD FOR COMMUNICATING THE GEOMETRY OF A CONTACT LENS

CROSS-REFERENCE TO RELATED APPLICATIONS

This Non-Provisional patent application claims priority to and the benefit of Provisional Patent Application Ser. No. 61/445,829, entitled SYSTEM AND METHOD FOR COMMUNICATING THE GEOMETRY OF A CONTACT LENS and filed Feb. 23, 2011, which is incorporated by reference herein in its entirety.

FIELD OF THE INVENTION

This invention relates to systems and methods for communicating the geometry of a contact lens, and more particularly, for communicating the geometry of any contact lens (e.g., a corneal refractive therapy contact lens) having a plurality of differently-shaped zones.

BACKGROUND OF THE INVENTION

Contact lenses often have complex geometries to accomplish intended optical outcomes. By way of example only, corneal refractive therapy contact lenses are used to treat a variety of visual acuity deficiencies. These lenses provide treatment by altering the shape of a patient's cornea, which adjusts the focal point of light within the eye and causes it to properly focus on the retina to enhance vision.

Corneal refractive therapy lenses are commonly described in terms of a plurality of zones, such as a central zone, a connecting zone and a peripheral zone. Generally speaking, the central zone fits onto the cornea of a patient and exerts a specific amount of pressure to flatten the cornea. The connecting zone allows adequate room for tearing and displacement of the cornea during treatment, and the peripheral zone grips the surface of the eye. That said, each zone may be shaped differently to accomplish its function.

Figure 1:
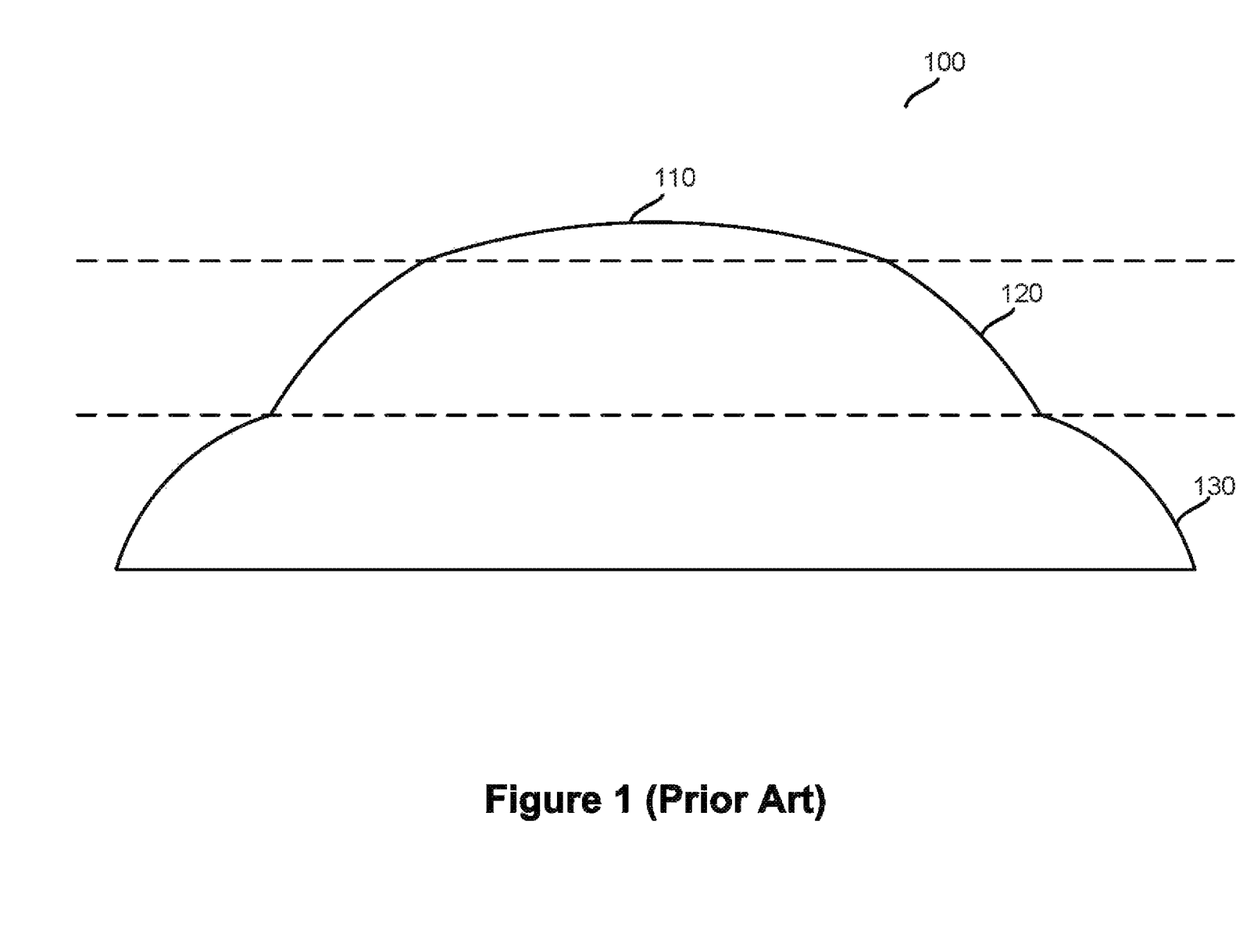
FIG. 1 illustrates a contact lens having a central zone, connecting zone and peripheral zone.

For example, FIG. 1 illustrates a conventional corneal refractive therapy lens 100, which includes central zone 110, connecting zone 120, and peripheral zone 130. Central zone 110 is generally spherical and has a first radius of curvature, connecting zone 120 has a second radius of curvature that is generally steeper (shorter radius) than the radius of curvature of the first zone, and peripheral zone 130 has a third radius of curvature that is generally flatter (larger radius) than the radii of curvature of the central and connecting zones. Although the zones are illustrated as substantially spherical in FIG. 1, depending upon the patient's pathology, the zones may be any shape suitable to effect treatment, such as aspherical or sigmoidal, or may be combination of spherical, aspherical and/or sigmoidal shapes.

Corneal refractive therapy contact lenses are commonly machined or molded from a single, continuous piece of polymer material. As such, given the above-described complex shape of corneal refractive therapy lenses, a disadvantage of these lenses is that it can be difficult for lens fitters to communicate the precise shape of the lens to the manufacturer.

Conventional systems and methods of communicating the shape of the lens require the lens fitter to designate points of origin of the radii of curvature along the central axis of the lens. However, the radii of curvature of the connecting and peripheral zones may be different than the radius of curvature of the central zone. As such, restricting the location of the point of origins to the central axis limits the lens fitter's choice of shape for these zones.

Figure 2:
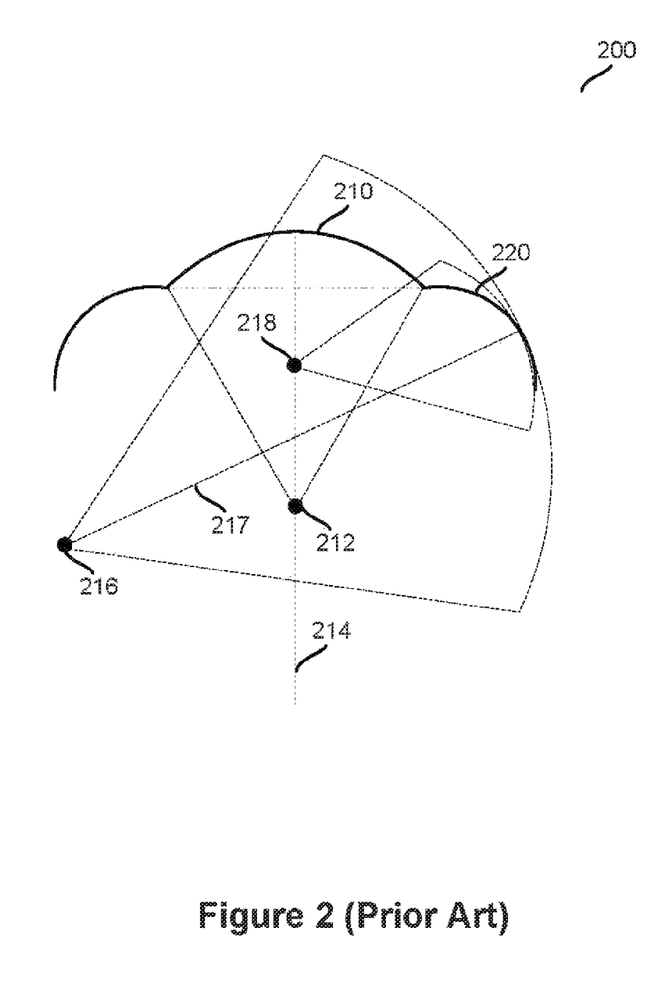
FIG. 2 illustrates a contact lens in which the point of origin of the radius of curvature of the connecting zone lies off the central axis of the lens.

For example, FIG. 2 illustrates contact lens 200 comprising central zone 210 and connecting zone 220. As shown, the point of origin of the radius of curvature of central zone 210 is shown as point 212 on central axis 214. However, the point of origin of connecting zone 220 is point 216 on axis 217. Selection of a point of origin on central axis 214, such as point 218, would result in a differently-shaped connecting zone, possibly causing discomfort to the wearer and reduced efficacy.

That said, a disadvantage of such conventional systems is that it is difficult to ascertain and communicate the location of points of origin lying off the central axis (such as in the connecting and peripheral zones) without complex geometric computation.

Accordingly, it would be advantageous to provide a method for defining and communicating the shape of the contact lens (whether or not intended for corneal reshaping) to the manufacturer that does not require the lens fitter to specify points of origin for the radii of curvature.

SUMMARY OF THE INVENTION

While the way that the present invention overcomes the disadvantages of the known art will be discussed in greater detail below, in general, the present invention is a method for communicating the shape of a contact lens.

An exemplary method includes: describing the shape of a first zone of a contact lens, and describing the shape of a second zone of the contact lens by providing an angle of orientation from a reference point that is specifiable relative to the first zone. In various embodiments, the method may further include describing the shape of one or more additional zones by providing angles of orientation from a reference point on another zone.

In various embodiments, empirical data and/or patient-specific data is used to determine the shape of the contact lens in one or more zones. That said, an exemplary method may comprise: measuring empirical and/or patient-specific data to determine the shapes of the central zone, connecting zone and peripheral zone; describing the shape of the central zone by specifying at least one geometric parameter; describing the shape of the connecting zone by specifying a first angle of orientation relative to a reference point on the central zone; describing the shape of the peripheral zone by specifying a second orientation relative to a reference point on the connecting zone; and communicating the geometric parameter, first angle of orientation and second angle of orientation to the manufacturer.

DETAILED DESCRIPTION

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step.

That said, a method for communicating the geometry of a contact lens is provided. In an exemplary embodiment, the method includes: (a) describing the shape of a first zone of a contact lens; and (b) describing the shape of a second zone of the contact lens by providing an angle of orientation from a reference point that is specifiable relative to the first zone. In various embodiments, the method may further include: (c) describing the shape of one or more additional zones by providing angles of orientation from a reference point on another zone.

As discussed above, an exemplary method includes describing the shape of a first zone of a contact lens. In various embodiments, the first zone is the central zone of the contact lens. However, it will be understood that the first zone may be any desired portion of the contact lens, such as the connecting zone or the peripheral zone.

Figure 3:
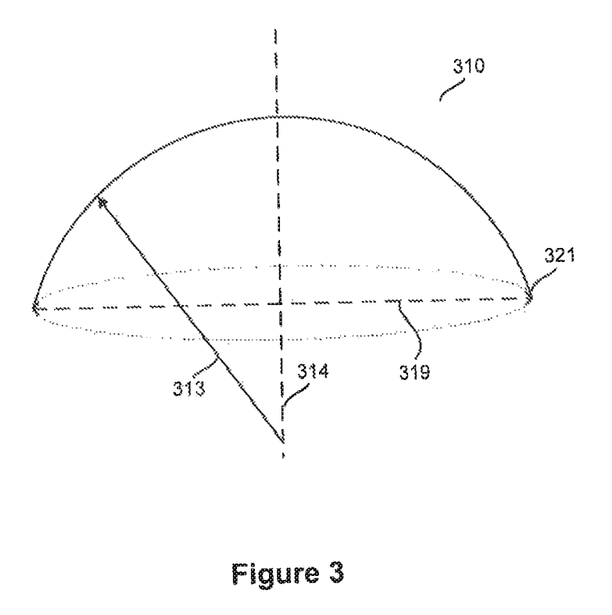
FIG. 3 illustrates a substantially spherical central zone of a contact lens that is described by a radius of curvature and a chord diameter.

The shape of the first zone may be described using any known or hereinafter devised system or methodology. In an embodiment, the shape of the first zone of the contact lens is described by specifying one or more geometric parameters. Any geometric parameter or combination of parameters that is sufficient to communicate the shape may be used. For example, FIG. 3 illustrates a first zone of a contact lens 310 having a substantially spherical shape that is described by radius of curvature 313 relative to central axis 314 and chord diameter 319. Other suitable geometric parameters for describing the shape include, for example, the depth of curvature, conic constants, polynomial equations, spline mathematics, and the edge profile of the lens.

In various embodiments, one or more geometric parameters are pre-specified by the lens fitter and/or manufacturer in order to minimize the number of variables and reduce the complexity of the instructions provided to the manufacturer. For example, one or more parameters may be pre-specified based upon historical fittings of the general population. In particular, it has been observed a chord diameter of the central zone of approximately 6 mm often provides a proper fit and clinical effectiveness. As such, in various embodiments, the chord diameter may be pre-specified as a constant. Moreover, other parameters such as the overall diameter, zone widths, edge profile and lens center and junction thicknesses may be pre-specified by the lens fitter or manufacturer. Thus, in an embodiment, the shape of the first zone of the lens may be communicated by specifying a single geometric parameter, such as the radius of curvature. In other embodiments, all of the geometric parameters may be pre-specified, such that it is not necessary for the lens fitter to provide further information to communicate the shape of the first zone.

In accordance with an exemplary embodiment, the geometric parameters are determined so as to satisfy the variables in a mathematical formula corresponding to a desired shape. In various exemplary embodiments, the mathematical formula is a polynomial equation. However, it will be understood that any mathematical formula that suitably describes the shape may be used. For example, in embodiments in which the shape of the first zone is aspherical, the shape may be described by the equation:

$$z(r) = \frac{r^2}{R\left(1 + \sqrt{1 - (1+K)\frac{r^2}{R^2}}\right)} + \alpha_1 r^2 + \alpha_2 r^4 + \alpha_3 r^6 + \ldots$$

where z(r) is the displacement of the surface of the lens from the vertex at distance r from the axis, R is the radius of curvature of the surface of the lens, K is the conic constant, and the coefficients $\alpha_i$ describe the deviation of the surface from a conic surface.

In various exemplary embodiments, the mathematical formula is pre-specified by the lens fitter or manufacturer.

As discussed above, an exemplary method includes describing the shape of a second zone of a contact lens by providing an angle of orientation from a reference point. The reference point may be located at any point that is specifiable relative to the first zone. In various embodiments, the reference point is located on the first zone. For example, the reference point may be an end or peripheral point of the shape of the first zone.

Figure 4:
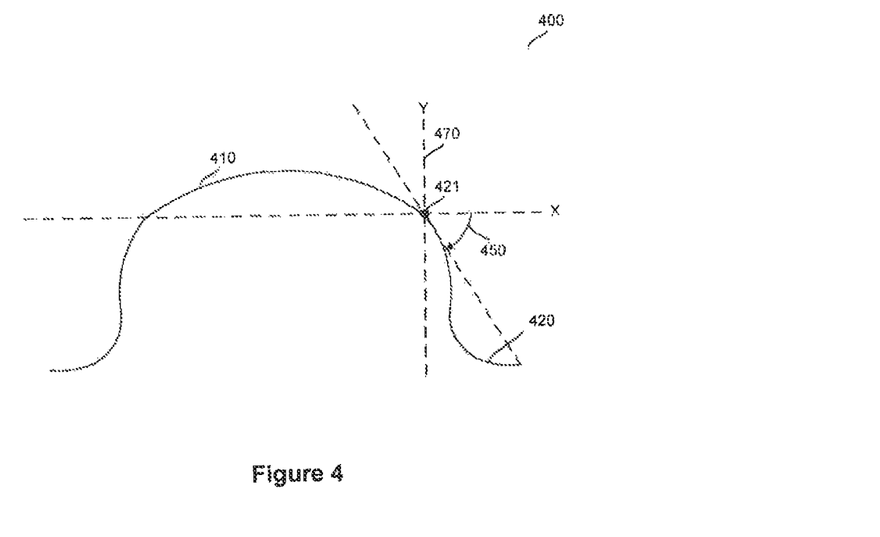
FIG. 4 illustrates a representative method for determining the shape of a second zone of a contact lens by specifying a reference point on the first zone of the lens and using the reference point and a Cartesian x,y plane to determine an angle of orientation.

FIG. 4 illustrates an exemplary embodiment of contact lens 400 comprising first zone 410 and second zone 420. Reference point 421 is an end point of first zone 410, and may be designated as the point of origin of Cartesian x,y plane 470. Using Cartesian x,y plane 470 and reference point 421, a lens fitter may specify an angle of orientation 450 for the shape of second zone 420. The shape may then be described by a mathematical equation. As discussed above, the mathematical equation may be pre-determined or may be provided by the lens fitter.

In an exemplary embodiment, the second zone is a connecting zone and comprises a sigmoidal shape, or the general shape of an elongated "S" having a transition from a concave curvature to a convex curvature. In such embodiments, the shape of the connecting zone may be described by the equation:

$$F(x) = \frac{1}{1+e^{-x}}$$

where x is the length of the sigmoid curve. In the alternative, the shape of the connecting zone may be described by the cubic equation: $Y=AX^3+BX^2+CX+D$.

In other embodiments, the shape of the zone may be substantially spherical, aspherical, or any other shape and may be described by any suitable equation.

Figure 5:
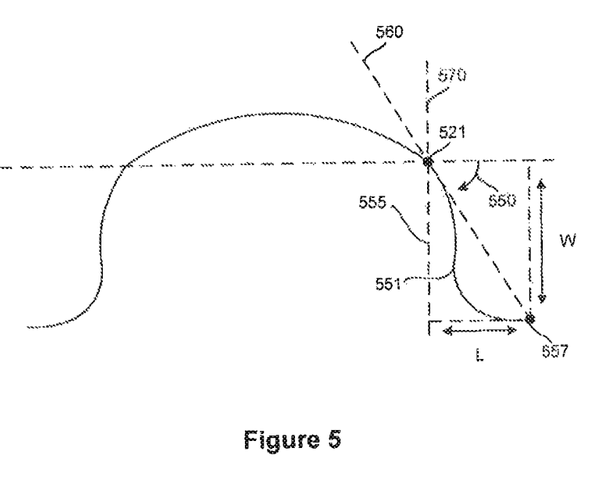
FIG. 5 illustrates a representative method for determining the end point of the shape of the connecting zone by specifying the length and width of an imaginary rectangle.

In various embodiments, the lens fitter further communicates the location of the end point of the shape of the second zone to the manufacturer. In an exemplary embodiment, the end point of the second zone may be communicated to the manufacturer by specifying the length and width of the shape. For example, FIG. 5 illustrates exemplary shape 551 having beginning point 521 of shape 551 corresponding to the top left of imaginary rectangle 555 (and the point of origin of Cartesian x,y plane 570), and end point 557 corresponding to the bottom right corner of imaginary rectangle 555. As such, end point 557 may be communicated to the manufacturer by specifying the length and width of imaginary rectangle 555. In other embodiments, and as also illustrated in FIG. 5, end point 557 may be communicated by specifying a point along axis 560, which is determined by angle of orientation 550. However, it will be understood that any system or method for specifying the location of end point 557 may be used. In other embodiments, end point may be predetermined by the manufacturer based upon historical data or other data.

Figure 6:
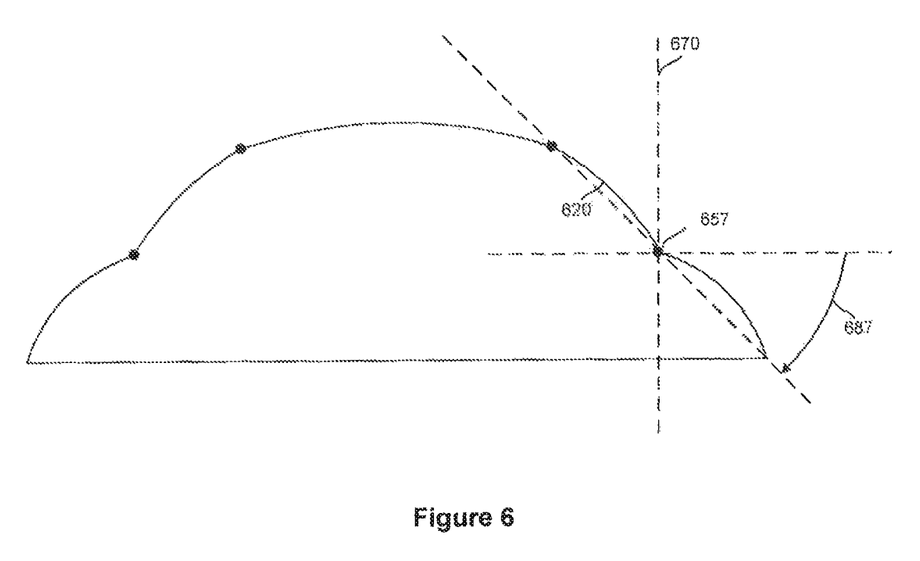
FIG. 6 illustrates a schematic representation of a method for determining the shape of a third zone of a contact lens by specifying a reference point on a second zone of the lens and using the reference point in connection with a Cartesian x,y plane to determine an angle of orientation.

As discussed above, an exemplary method may further include describing the shape of any additional zones of the contact lens by providing an angle of orientation from a reference point on another zone. For example, as shown in FIG. 6, end point 657 of second zone 620 acts as the reference point for establishing angle of orientation 687 relative to Cartesian x,y plane 670. As discussed above, the shape of the additional zone can then be described by a mathematical equation. The mathematical equation may be pre-determined by the manufacturer or may be provided by the lens fitter. This methodology may be used to describe the shape of any number of additional zones.

In exemplary embodiments, the diameter of the overall lens is between about 7 mm and about 24 mm, and generally the diameter of the lens is between about 9.5 mm and about 18 mm. One skilled in the art will appreciate that a lens diameter according to the present invention may be much larger or smaller, depending on the intended purpose and the size of the cornea, and in some embodiments, the sclera, to be fitted with the lens.

It should be noted that the variable beginning points, angles, shapes, endpoints and other parameters discussed herein generally relate to the lens shape as seen in cross section (e.g., along a semi-meridian of the lens). In various embodiments, the parameters may be rotationally constant. However, in other embodiments, the radial shape of the contact lens within one or more zones may vary rotationally. For instance, adjacent or alternate semi-meridians of the contact lens may have different radii of curvature within one or more zones, and the lens may generally provide for a smooth rotational transition between differing semi-meridians. In this regard, an exemplary method may further include describing radial transitions of one or more semi-meridians as well as rotational transitions therebetween, which may themselves vary radially.

Figure 7A:
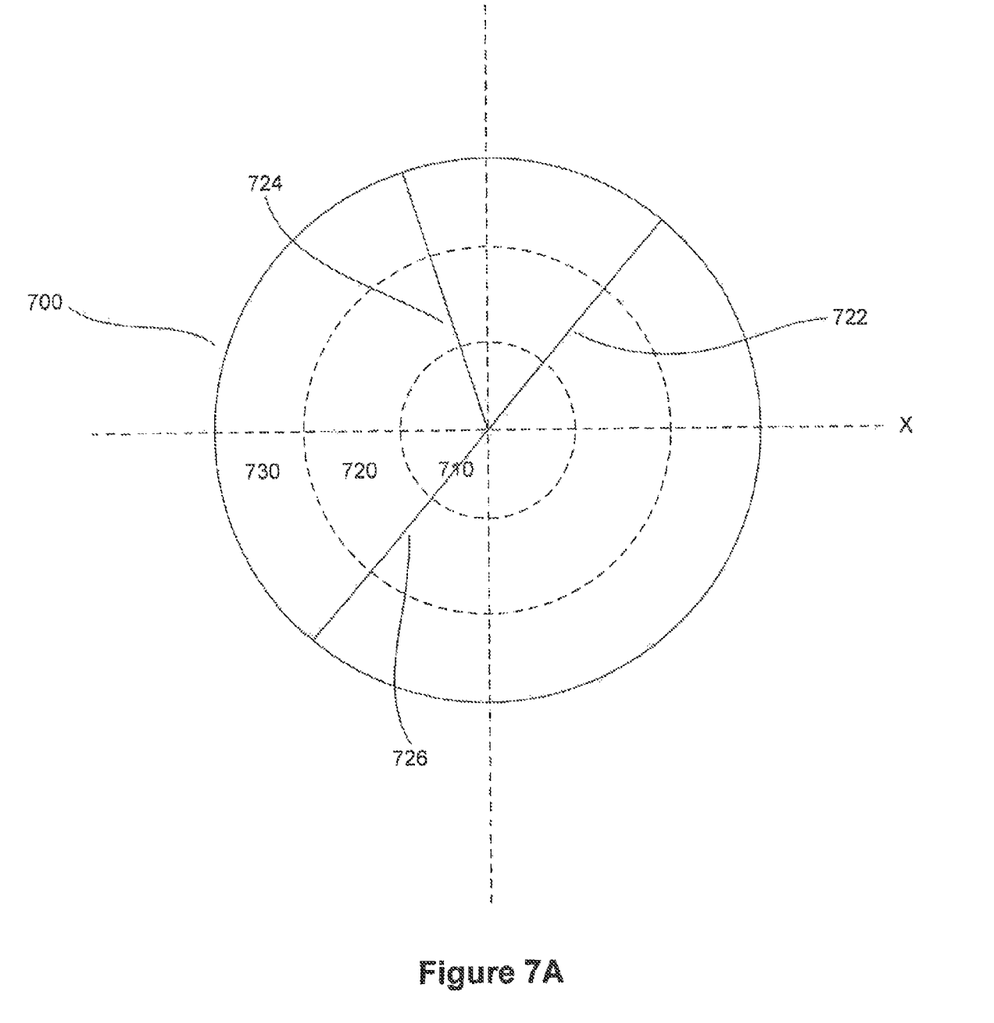
FIGS. 7A-7D illustrate radial transition variation between semi-meridians, in accordance with exemplary embodiments of the invention.
Figure 7B:
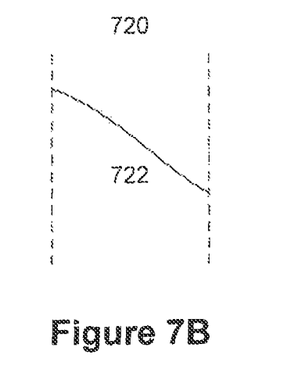
Figure 7C:
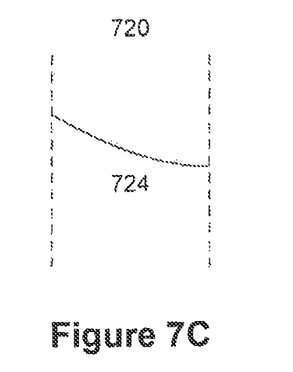
Figure 7D:
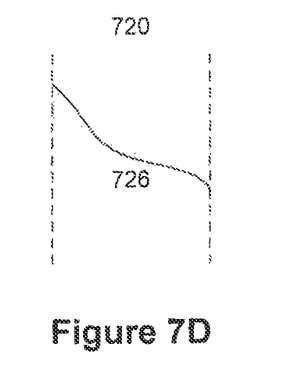

In exemplary embodiments, and with reference to FIG. 7A, a contact lens 700 comprises a first zone 710, a second zone 720, and a third zone 730. In exemplary embodiments, and with reference to FIGS. 7B-7D, the radial transition within second zone 720 along semi-meridians 722, 724, and 726 may vary.

In various embodiments, the contact lens is materially, structurally, spatially, or otherwise configured to be exhibit increased rotational stability.

In various embodiments, the shape of one or more zones of the contact lens, and therefore, the geometric parameters and/or the angles of orientation may be determined based upon the characteristics of the patient's eye, and more particularly, the amount of correction required. For example, in various embodiments, the radius of curvature of the central zone may be specified so as to be equivalent to the desired post treatment radius of curvature of the cornea.

In particular, empirical data and/or patient-specific data may be used by the lens fitter, alone or in combination with other data, to allow the lens fitter to determine the shape of the contact lens in one or more zones.

The lens fitter may also recommend the material(s) of the contact lens in one or more zones. For instance, in accordance with exemplary embodiments, the lens is comprised of one or more of fluorosilicon acrylate, silicon acrylate, polymethylmethacrylate, a silicon hydrogel, or another suitable material. In general, any gas permeable, biocompatible material is suitable for use herein.

In an exemplary embodiment, the empirical data is measured by performing an eye test by a technician or other lens fitter, which can then be used to determine the geometric parameters. The patient-specific data may include on-eye and/or environmental factors, among other factors and/or data. The patient specific factors may also include whether the patient plays sports, has abnormally dry or wet eyes, etc. The on-eye data may include the patient's visual acuity with the fit and feel of the particular lens, among other data. Patient-specific data may be determined, for example, measuring the eye, vision tests, patient-feedback, etc.

The environmental factors may include the environment where the patient spends a lot of time, such as outdoors, in a dry climate, in a laboratory, in an office in front of a computer screen, and other factors.

In various exemplary embodiments, the shape of one or more zones may be determined using any suitable equipment for determining the amount of correction required. For example, a keratometer may be used to calculate a single point value at the apex of a patient's cornea to establish the radius of curvature of the central zone. A corneal topographer, computer assisted videokeratoscope, optical coherent Tomographer, Scheimpflug camera topographer or fringe topographer may be used to determine the shape of the cornea and/or the sclera.

In various exemplary embodiments, the shape of one or more zones may be determined using a kit of lenses.

Figure 8:
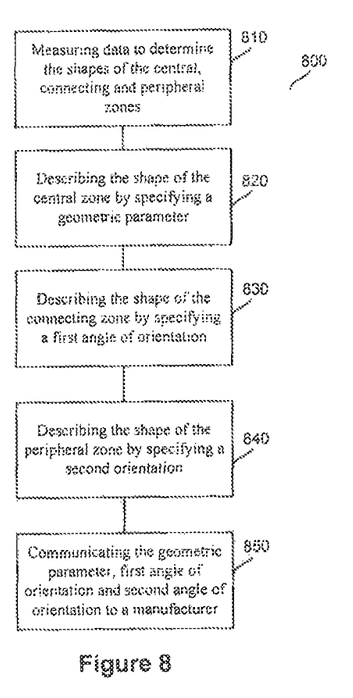
FIG. 8 illustrates a schematic flow chart of a representative method for communicating the geometry of a contact lens.

That said, FIG. 8 describes exemplary method 800 for communicating the shape of a contact lens comprising a central zone, a connecting zone, and a peripheral zone. Method 800 includes: Step 810: measuring empirical and/or patient-specific data from a patient to determine the shapes of the central zone, connecting zone and peripheral zone; Step 820: describing the shape of the central zone by specifying at least one geometric parameter; Step 830: describing the shape of the connecting zone by specifying a first angle of orientation relative to a point on the central zone; Step 840: describing the shape of the peripheral zone by specifying a second orientation relative to a point on the connecting zone; and Step 850: communicating the geometric parameter, first angle of orientation and second angle of orientation to the manufacturer.

In various exemplary embodiments, the method may further include the step of communicating one or more additional parameters of the contact lens to the manufacturer. For example, spherical correction parameters, cylindrical correction parameters, prism and base parameters, multifocal correction parameters, peripheral refraction or defocus parameters or higher order aberration correction parameters may be specified.

A spherical correction generally indicates the amount of correction of the refractive error of the eye by adding or subtracting refractive strength symmetrically, by the same amount, along a horizontal and vertical axis. Cylindrical correction parameters indicate the amount of correction of the refractive error of the eye by adding or subtracting strength along the horizontal axis, the vertical axis, or a diagonal axis.

Prism and base parameters refer to prescription features that are used to treat muscular imbalance or other conditions that cause errors in eye orientation, and are not seen in most prescriptions. Prism and base parameters may also refer to features used to rotationally stabilize a lens.

Multifocal correction parameters generally indicate a second refractive correction for the purpose of compensating for the loss of accommodation with presbyopia. Peripheral refraction or defocus parameters refer to generally off axis optical features which control the focal distance of light with regard to the peripheral retina. Such features are useful for regulating the development of refractive errors.

Higher order aberration correction parameters are useful for improving the modulation transfer function of the lens eye system and are determined by use of wavefront aberrometers. Higher order aberration correction parameters can be described by Zernike polynomial equations or by other mathematical methods. It will be understood that any desired number of parameters may be specified and fall within the scope of the invention.

Figure 9:
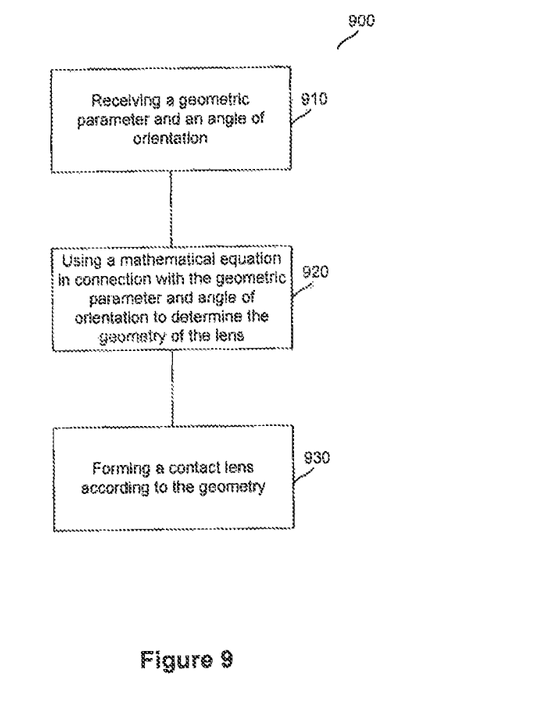
FIG. 9 illustrates a schematic flow chart of a representative method for manufacturing a contact lens according to the system and method described herein.

FIG. 9 describes exemplary method 900 for manufacturing a contact lens according to the system and methods discussed herein. Method 900 includes: Step 910: receiving at least one geometric parameter relating to a first zone of a contact lens and an angle of orientation of a second zone relative to a reference point on the first zone; Step 920: using a mathematical equation in connection with the geometric parameter and angle of orientation from the reference point to determine the geometry of the contact lens; and Step 930: forming a contact lens according to the geometry.

It will be understood that any system and methods for manufacturing the contact lenses according to the systems and methods described herein may be used. For example, the lenses may be lathe cut, molded, or spin-cast.

Benefits, other advantages, and solutions to problems have been described herein with regard to specific embodiments. It should be understood that various principles of the invention have been described in illustrative embodiments only. For instance, various embodiments have been described with reference to corneal refractive therapy lenses, however those skilled in the art will appreciate that the invention is not limited to lenses intended for corneal reshaping. The scope of the invention is accordingly to be limited by nothing other than the appended claims, in which reference to an element in the singular is not intended to mean "one and only one" unless explicitly so stated, but rather "one or more." No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A method for communicating the shape of a contact lens to a manufacturer, the contact lens having a first zone and a second zone, the method comprising:

describing the shape of the first zone of the contact lens by providing a geometric parameter; and describing the shape of the second zone of the contact lens by providing a first angle of orientation wherein the first angle of orientation is defined as an angle between a first line and a second line wherein the first line includes both a reference point on the first zone and a point tangent to the surface of the second zone and the second line is vertical or horizontal through the reference point on the first zone.

2. The method according to claim 1, wherein the geometric parameter is the radius of curvature.

3. The method according to claim 1, wherein the reference point on the first zone is an end point of the shape of the first zone.

4. The method according to claim 1, further comprising the step of measuring empirical and/or patient-specific data from a user to determine at least one of the geometric parameter and the first angle of orientation.

5. The method according to claim 1, further comprising the step of using a kit of lenses to determine at least one of the geometric parameter and the first angle of orientation.

6. The method according to claim 1, further comprising the step of describing the shape of the second zone of the contact lens by pre-providing a mathematical equation to the manufacturer.

7. The method according to claim 1, further comprising the step of describing the shape of a third zone of the contact lens by providing a second angle of orientation wherein the second angle of orientation is defined as an angle between a third line and a fourth line wherein the third line includes both a reference point on the second zone and a point tangent to the surface of the third zone and the fourth line is vertical or horizontal through the reference point on the second zone.

8. The method according to claim 7, wherein the reference point on the second zone is an end point of the shape of the second zone.

9. A method for communicating the shape of a contact lens, the contact lens having a first zone and a second zone, the method comprising:

describing the shape of the first zone of the contact lens by providing a geometric parameter;

describing the shape of a first semi-meridian of the second zone of the contact lens by providing a first angle of orientation wherein the first angle of orientation is defined as an angle between a first line and a second line wherein the first line includes both a first reference point on the first zone and a first point tangent to the surface of the second zone and the second line is vertical or horizontal through the first reference point on the first zone;

describing the shape of a second semi-meridian of the second zone of the contact lens by providing a second angle of orientation wherein the second angle of orientation is defined as an angle between a third line and a fourth line wherein the third line includes both a second reference point on the first zone and a second point tangent to the surface of the second zone and the fourth line is vertical or horizontal through the second reference point on the first zone, wherein the shapes of the first and second semi-meridians differ; and describing a rotational transition between the first and second semi-meridians.

10. The method according to claim 9, wherein the geometric parameter is the radius of curvature.

11. The method according to claim 9, wherein the first reference point on the first zone is a first end point of the shape of the first zone.

12. The method according to claim 11, wherein the second reference point on the first zone is a second end point of the shape of the first zone, wherein the second end point is different from the first end point.

13. The method according to claim 9, further comprising the step of measuring empirical and/or patient-specific data from a user to determine at least one of the geometric parameter, the first angle of orientation and the second angle of orientation.

14. The method according to claim 9, further comprising the step of using a kit of lenses to determine at least one of the geometric parameter, the first angle of orientation and the second angle of orientation.

15. A method for manufacturing a contact lens comprising:

receiving at least one geometric parameter relating to a first zone of a contact lens;

receiving an angle of orientation of a second zone of the contact lens wherein the angle of orientation is defined as an angle between a first line and a second line wherein the first line includes both a reference point on the first zone and a point tangent to the surface of the second zone and the second line is vertical or horizontal through the reference point on the first zone;

using a mathematical equation in connection with the angle of orientation and the reference point to determine a geometry of the contact lens; and forming the contact lens according to the geometry.

* * * * *